(12) United States Patent
Ekvall et al.

(10) Patent No.: US 8,463,507 B2
(45) Date of Patent: Jun. 11, 2013

(54) METHOD AND A SYSTEM FOR CONTROLLING AN INPUT POWER

(75) Inventors: Andreas Ekvall, Hallstahammar (SE); Jan Karlsson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 710 days.

(21) Appl. No.: 12/527,000

(22) PCT Filed: Feb. 13, 2007

(86) PCT No.: PCT/SE2007/000133
§ 371 (c)(1),
(2), (4) Date: Dec. 17, 2009

(87) PCT Pub. No.: WO2008/100185
PCT Pub. Date: Aug. 21, 2008

(65) Prior Publication Data
US 2010/0179735 A1 Jul. 15, 2010

(51) Int. Cl.
*G06F 7/70* (2006.01)
(52) U.S. Cl.
USPC .......................................................... 701/50
(58) Field of Classification Search
None
See application file for complete search history.

(56) References Cited

U.S. PATENT DOCUMENTS

| 4,846,283 A | 7/1989 | Batcheller |
| 5,214,916 A | 6/1993 | Lukich |
| 6,010,309 A | 1/2000 | Takamura et al. |
| 6,427,107 B1 | 7/2002 | Chiu et al. |
| 7,190,292 B2 * | 3/2007 | Bizjak ........................... 341/139 |
| 2003/0098805 A1 * | 5/2003 | Bizjak ........................... 341/139 |
| 2004/0021441 A1 * | 2/2004 | Komiyama et al. ........... 320/104 |

FOREIGN PATENT DOCUMENTS

| EP | 1439337 A1 | 7/2004 |
| WO | 9735133 A1 | 9/1997 |

OTHER PUBLICATIONS

International Search Report for corresponding International Application PCT/SE2007/000133.
International Preliminary Report on Patentability for corresponding International Application PCT/SE2007/000133.

* cited by examiner

*Primary Examiner* — Thomas Tarcza
*Assistant Examiner* — Adam Alharbi
(74) *Attorney, Agent, or Firm* — WRB-IP LLP

(57) ABSTRACT

A method for controlling power to at least one power consuming device includes detecting at least one first operational parameter and at least one second operational parameter, establishing a power value based on the detected values of the first and second operational parameters, and controlling the power consuming device in response to the established power value.

27 Claims, 4 Drawing Sheets

METHOD AND A SYSTEM FOR CONTROLLING AN INPUT POWER

The present invention relates to a method for controlling an input power to at least one power consuming device. The invention is particularly directed for application in a work machine.

The term "work machine" comprises different types of material handling vehicles like construction machines, such as a wheel loader, a backhoe loader and an articulated hauler. A work machine is provided with a bucket or other type of work implement for carrying/transporting a load. Further terms frequently used for work machines are "earth-moving machinery" and "off-road work machines". The invention will be described below in a case in which it is applied in a frame-steered work machine constituting a wheel loader. This is to be regarded only as an example of a preferred application.

The work machine comprises a powertrain for propelling the machine via ground engaging members (wheels or crawlers). A power source, preferably an internal combustion engine, and especially a diesel engine, is adapted to provide the power for propelling the machine.

The work vehicle further comprises a hydraulic system. The hydraulic system comprises at least one variable displacement pump and at least one actuator operatively driven by pressurized hydraulic fluid delivered from said pump. The system may be of load-sensing type, wherein the pump displacement is controlled by a pilot pressure representing a load exerted on the system. The pump is normally operatively driven by the diesel engine.

Said actuator may be a linear actuator in the form of a hydraulic cylinder. A wheel loader comprises several such hydraulic cylinders in order to perform certain functions. A wheel loader is frame-steered and a first pair of hydraulic cylinders is arranged for turning the wheel loader. Further, there are hydraulic cylinders provided for lifting a load arm unit and tilting a work implement, for example a bucket, arranged on the load arm unit.

A load sensing hydraulic system is characterized by that the operating condition of the load is sensed and that the output pressure of the pump is controlled so that it exceeds the load pressure existing in the hydraulic actuator by a predetermined differential.

In order for the work vehicle to function well, the engine, transmission and hydraulic system must be balanced with regard to an available engine torque and the desired power. It is difficult to find an engine that exactly manages the desired power at different engine speeds. The problem with different power demand is particularly pronounced at low engine speeds. If the driver utilizes the power from the engine at low engine speeds to drive the vehicle's half shafts at the same time as the hydraulic system is activated, then there is a risk that the engine will cut out or that the engine will "stick", that is it will not be able to increase the engine speed when the driver depresses the accelerator pedal. The driver can, of course, adjust the power consumption via various controls, when he senses a loss of engine speed, but this can be problematical, particularly when the engine suddenly cuts out. Further, even skilled drivers overcompensate and therefore unnecessarily reduce the amount of hydraulic work the hydraulic system is truly capable of performing. As a result, machine productivity is reduced.

It is desirable to achieve a control method, which creates conditions for accurately controlling an input power to at least one power consuming device relative to an available power in a power source. More specifically, the method is preferably applied for a power source in the form of an internal combustion engine, wherein different magnitudes of the output power are available at different engine speeds. Preferably, the method creates conditions for limiting the hydraulic power to relieve engine load, especially when there is a risk for stalling the engine.

According to an aspect of the present invention, a method comprises the steps of detecting at least one first operational parameter and at least one second operational parameter, establishing a power value based on the detected values of the first and second operational parameters, and controlling the power consuming device in response to the established power value. The power value is preferably calculated by means of a predetermined algorithm.

The power consuming device is a preferably hydraulic device, such as a hydraulic pump with a variable displacement, which is driven by the power source.

The first operational parameter is preferably indicative of an available output power of a power source configured to propel the vehicle. Thus, the first operational parameter may be indicative of an available output torque of an engine. Further, the method preferably comprises detecting a plurality of second operational parameters and controlling the power consuming device accordingly. In this way, a further more accurate power control may be achieved. More specifically, some second operational parameters may indicate a shortage of available output power of the power source while other second operational parameters may indicate a surplus of available output power of the power source. For example, a plurality of values of the second operational parameters, which may be both positive and negative, are summarized, and added to a nominal power value determined by the first operational parameter.

The second operational parameter preferably comprises at least one of an operator input signal, a turbocharger pressure, a gear state, a hydraulic pressure in a hydraulic system, a position of an accelerator pedal, an ambient pressure, a vehicle speed and a vehicle angle speed.

Thus, according to a first preferred embodiment, the method comprises the steps of establishing a nominal power value based on the detected value of the first operational parameter and establishing an offset from the nominal power value based on the second operational parameter (s), and establishing the power value by adding the offset to the nominal power value. Preferably, the offset is established in response to a plurality of detected second operational parameters.

Preferably, the method comprises the steps of using a standard curve representative of a relation between the first operational parameter and the power in order to establish the nominal power value. Starting from a standard curve and adding a plurality of individual offsets creates conditions for tuning and adapting the function to different engines and applications.

It is also desirable to achieve a corresponding control system, which creates conditions for accurately controlling an input power to at least one power consuming device relative to an available power in a power source.

According to another aspect of the present invention, a system comprises means for detecting at least one first operational parameter, means for detecting at least one second operational parameter, means for establishing a power value based on the detected values of the first and second operational parameters, and means for controlling the power consuming device in response to the established power value.

Other advantageous embodiments of the invention and its associated advantages are apparent from the following description.

BRIEF DESCRIPTION OF DRAWINGS

The invention will be described in greater detail in the following, with reference to the embodiments shown in the attached drawings, in which.

DETAILED DESCRIPTION

Figure 1:
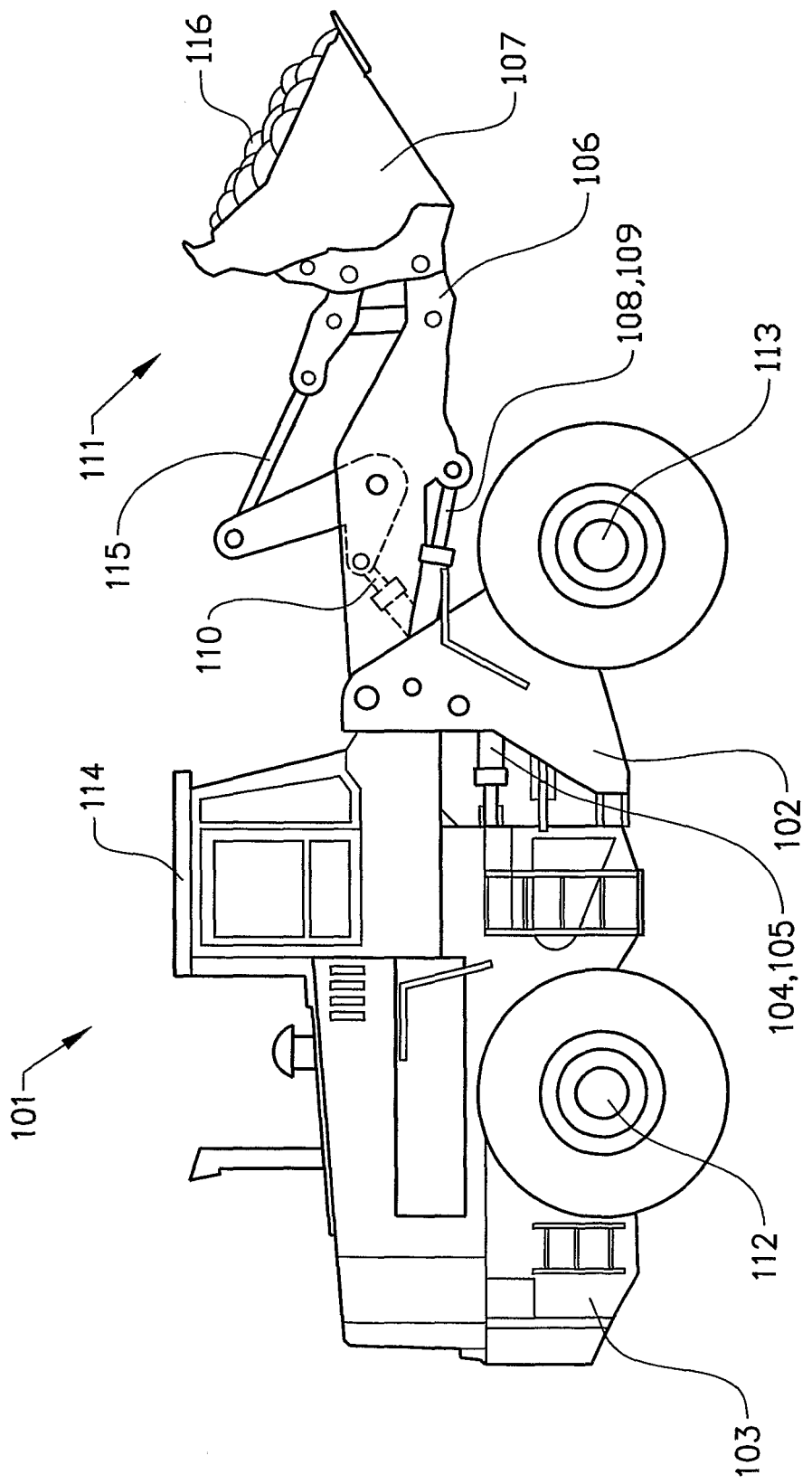
FIG. 1 shows a wheel loader in a side view, FIG. 2 schematically shows an exemplary embodiment of a system for controlling an input power.

FIG. 1 shows a wheel loader 101. The body of the wheel loader 101 comprises a front body section 102 with a front frame, and a rear body section 103 with a rear frame, which sections each has a pair of half shafts 112,113. The rear body section 103 comprises a cab 114. The body sections 102,103 are connected to each other via an articulation joint in such a way that they can pivot in relation to each other around a vertical axis. The pivoting motion is achieved by means of a pair of first actuators in the form of hydraulic cylinders 104, 105 arranged between the two sections 102,103. Thus, the wheel loader is an articulated work vehicle. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and a work implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
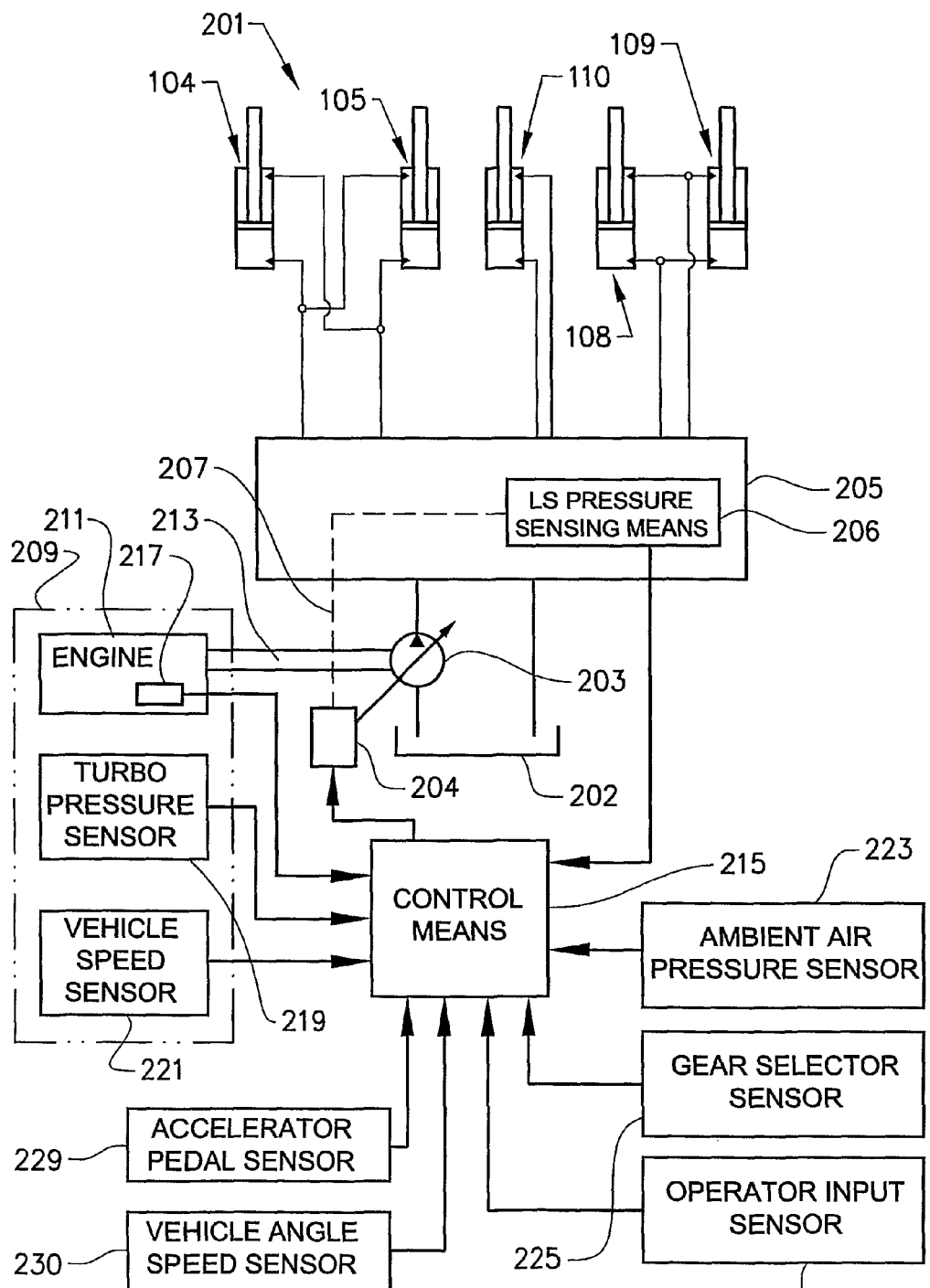

FIG. 2 schematically shows a system 201 for controlling an input power to a power consuming device 203 constituting a variable displacement hydraulic pump, wherein a hydraulic output of the pump can be controlled.

The pump 203 is configured for delivering pressurized hydraulic fluid from a tank 202 to the cylinders 104,105,108, 109,110. A number of electronically controlled valve units are hydraulically connected between the pump 203 and the cylinders 104,105,108, 109,110 for regulating the reciprocating work of the cylinders. The system of hydraulic valve units is, for ease of presentation, represented by a single box 205.

A displacement control means 204 is arranged at the pump 203 for controlling the displacement thereof. The pump 203 includes a swash plate being rotatable for varying the pump displacement. The displacement control means 204 may in a per se known design comprise a mechanical element coupled to the swash plate for rotating the same and set it in a desired position. The displacement control means 204 works against spring force. The displacement control means 204 is preferably hydraulically activated via a pressure sensing means 206, such as a valve see dotted line 207. More specifically, the hydraulic arrangement 205 is load sensing and the pump displacement is automatically controlled by a pilot pressure signal representing a load exerted on the system. In other words, the displacement of the pump 203 is controlled by a load signal (pressure signal) representing an actual load.

The hydraulic system 205 further comprises shuttle valve means operable for routing the larger fluid pressure existing at the output ports of the valve units controlling the different cylinders 104,105,108,109,110 to the pump displacement control arrangement to thereby automatically control the pump 203 to satisfy the highest demand of the loads. The pump 203 is hydraulically controlled to deliver an output pressure equal to such highest load pressure plus the load sensing pressure drop of the valve unit associated with the load. For example, the pump may be adapted to deliver a pressure of 25 bar higher than the load pressure.

A powertrain 209 comprises a power source 211 and a system (not shown) for transmitting power from the power source 211 to the wheels for propelling the wheel loader. According to a preferred example, the powertrain is of a mechanical type and preferably comprises from the power source to the ground engaging members the following: a clutch and/or a torque converter, a transmission, a cardan shaft, a differential gear and transverse half shafts.

The power source 209 (prime mover) is adapted to provide a motive power for propelling the vehicle and to operatively drive the variable displacement pump 203 via a drive shaft 213. The power source 209 is preferably an internal combustion engine, especially a diesel engine.

The control system 201 comprises a control means 215, or controller (or computer). The control means 215 is configured to receive input information from a plurality of sensors and other input means 217, 219, 221, 223, 225, 227, 229 and responsively control the hydraulic pump 203 via the control means 204. More specifically, a maximum available displacement of the hydraulic pump is limited to different extents based on the input information.

More specifically, the control system 201 comprises means 217 for detecting a first operational parameter constituting a parameter indicative of an operational condition of the powertrain 209, namely an engine speed. The control system 201 further comprises means for detecting a plurality of second operational parameters. The means for detecting second operational parameters comprises means for detecting a parameter indicative of an operational condition of the powertrain 209, namely a turbocharger pressure sensor 219 and a vehicle speed sensor 221.

The means for detecting second operational parameters further comprises an ambient pressure sensor 223, a gear selector sensor 225, an operator control element (control lever) input sensor 227, an accelerator pedal sensor 229 and a vehicle angle speed sensor.

The vehicle angle speed sensor is adapted to detect a relative speed of the front and rear body sections 102,103. The sensor may be formed by an angular sensor positioned at the articulation joint or at the connection point of one of said steering cylinders 104,105. Alternatively, the sensor may be formed by a linear sensor at one of said steering cylinders 104,105.

The control means 215 is adapted for establishing (calculating) an input power value based on the detected values of the first and second operational parameters by means of an algorithm. The control means 215 is further adapted to control the power consuming device 203 in response to the established input power value.

According to one example, an intention of the driver to increase an engine speed may result in decreasing a demanded hydraulic work function, which leads to a better engine response. According to another example, upon detection of a neutral position in the gearbox, an increased hydraulic power is allowed.

The control method will be described below referring to the flow chart in FIG. 3 and an algorithm example represented by the graph in FIG. 4.

Figure 4:
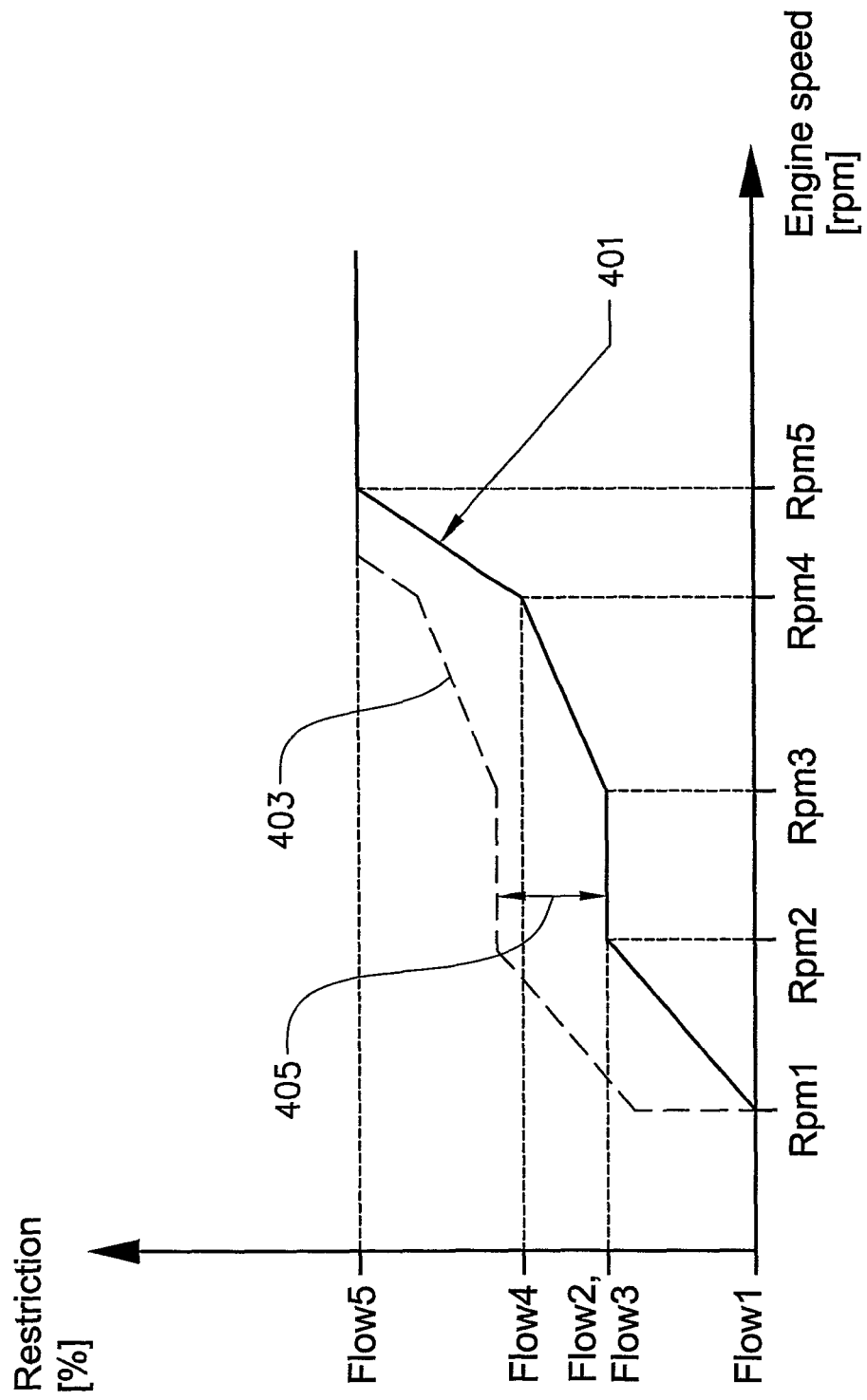
FIG. 4 is graphical illustration of an example curve for use in the control method.

Referring to FIG. 4, a predetermined standard curve 401 is used representative of a relation between the engine speed and a flow restriction in order to establish the nominal flow restriction value. A resulting curve, see dotted line 403, indicates the result of adding an offset 405 to the standard curve. The offset is in turn generated by adding a plurality of individual offsets, each based on a specific operational parameter.

Further referring to FIG. 4, a maximum restriction (Flow1) corresponds to an output signal of 0%. No restriction (Flow 5) corresponds to an output signal of 100%.

At engine speed>=Rpm5, there should be no restriction (100%) even if other control conditions are fulfilled.

At Rpm1<=engine speed<=Rpm 5, the standard curve is calculated, as shown in FIG. 4. At engine speed<Rpm1, the standard curve results in the restriction value of Flow1.

If a used engine torque>a maximum torque value and/or LS pressure>an LS limit value, then the standard curve should be used as an output signal plus (or minus) the offset. The output signal cannot be greater than 100% or lower than 0% no matter how the standard curve plus or minus the offset adds up.

The output signal shall be set to 100% when the LS pressure<=an LS low limit value regardless of any other signals. Said LS low limit value is used as release pressure to get a hysteresis on the LS pressure to avoid harmonics.

The turbo_offset is added to the standard curve when the detected turbo pressure is >a turbo high limit value. Nothing is added to the standard curve when the detected turbo pressure is <a turbo low limit value. It should be noted that there is a hysteresis here to avoid harmonics.

The neutral_offset is added to the standard curve when the detected gear is in neutral position. Nothing is added to the standard curve when the gear is not in the neutral position.

The LS_offset should be subtracted from the standard curve when the detected LS pressure is >an LS high limit value. When the detected LS pressure is <an LS high release value, then nothing should be subtracted from the standard curve (note the hysteresis).

When the accelerator pedal is in a position>accelerator start position, then an offset is subtracted from the standard curve. The offset is calculated according to: offset=accelerator_offset*(accelerator_pedal_position-accelerator_start_position)/(100-accelerator_start_jposition).

Figure 3:
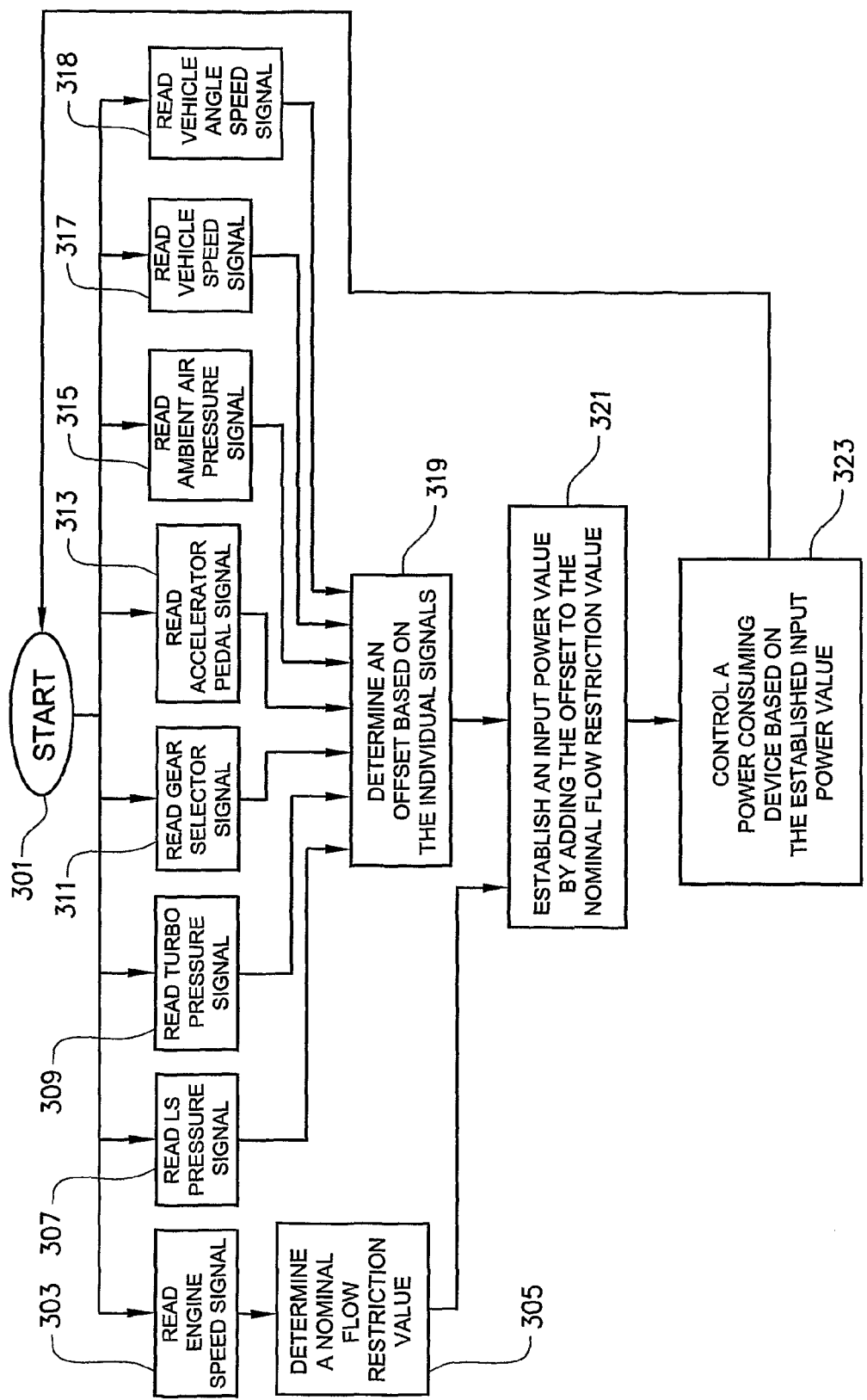
FIG. 3 is a flow chart for a control method according to a first example.

Turning now to FIG. 3, the logic starts in block 301. The logic then continues to read a first operational parameter: an engine speed signal in block 303 and responsively determines a nominal flow restriction value in block 305.

The logic further continues to read a plurality of second operational parameters: a load sensing pressure signal in block 307, a turbo pressure signal in block 309, a gear selector signal in block 311, an accelerator pedal signal in block 313, an ambient pressure signal in block 315, a vehicle speed signal in block 317 and a vehicle angle speed in block 318. Each of the detected second operational parameters is indicative of an individual offset. The logic determines a total offset by adding the individual offsets in block 319. The total offset 405 is indicated in FIG. 4 by the distance between the dotted line 403 and the standard curve 401.

The logic then continues to block 321 and establishes an input power value by adding the total offset to the nominal flow restriction value from box 305.

The logic then continues to block 323, wherein the pump 203 is controlled according to the finally determined input power (or in this case flow restriction). More specifically, a maximum pump displacement is limited. Within the established upper limit, the actual pump displacement is controlled in a known way by a pilot pressure representing a load exerted on the system.

An example of how the flow is calculated in a specific operation point is shown below: The standard curve 401 should be mapped according to the engine dynamic torque characteristics. If the engine rpm in this example is rpm3 (850 rpm), then the standard flow is flow3 (in this example 55%).

The individual offsets in this example are turbo pressure, gear state, hydraulic load, accelerator pedal position, ambient air pressure, vehicle speed. Their contributions to the final offset are:

Turbo pressure>Turbo_high (ex 1.5 bar), the turbo_offset is then a fixed value or linearly dependant of the turbo pressure. The turbo_offset is an addition to the standard curve since more torque is available. In this example a fixed value of 20% is used.

Gear is Forward, the gear_offset is then a fixed value. The gear_offset is an subtraction to the standard curve since less torque is available. In this example a fixed value of 10% is used.

Hydraulic load>hydraulic_load_high (ex 120 bar),), the hydraulic_offset is then a fixed value or linearly dependant of the hydraulic load. The hydraulic_offset is a subtraction to the standard curve since the hydraulic power consumption is higher at a fixed hydraulic flow. In this example a fixed value of 25% is used.

Accelerator position>accelerator_position_limit (ex 20% pedal), the accelerator_offset is then a fixed value or linearly dependant of the accelerator position. The accelerator_offset is a subtraction to the standard curve since the operator demands increased engine rpm. In this example a fixed value of 15% is used.

Ambient air pressure<ambient_air_pressure_limit (ex 800 mbar), the ambient_offset is then a fixed value or linearly dependant of the ambient air pressure. The ambient_offset is a subtraction to the standard curve since the available torque is reduced. In this example a fixed value of 15% is used.

Vehicle speed>vechicle_speed_limit (ex 20 km/h), the speed_offset is then a fixed value or linearly dependant of the vehicle speed. The speed_offset is a addition or subtraction to the standard curve depending on the application. For safety reason a subtraction can be used and for performance reason an addition can be used. In this example a fixed value of +10% is used.

vehicle angle speed*hydraulic load>vehicle angle speed torque limit (ex 160) the vehicle angle speed torque offset is then a fixed value or linearly dependant of the vehicle angle speed*hydraulic load. The vehicle angle speed torque offset is an subtraction to the standard curve since less torque is available. In this example a fixed value of 10% is used The flow at rpm3 is then=flow3+turbo_offset−gear_offset−hydraulic_offset−accelerator_offset−ambient_offset+speed_offset−vehicle_angle_speed torque_offset=55+20−10−25−15−15+10−10=10%

According to an alternative embodiment, the method is adapted to automatically manipulate a demand signal received from an operator control element, such as a lever or joystick. The demand signal is indicative of a desired power for a specific work function, such as lifting a load by means of the work implement. The operator demand signal is generated upon movement of the operator controlled element and received by a controller. The controller calculates an input power according to the algorithm described above and limits the demand signal by a calculated percentage. The lifting function is controlled according to the calculated input power by means of controlling the position of valve units (throttling the flow to the cylinders) or controlling a pump or other flow restriction means.

According to a further alternative embodiment, the inventive method is used to control a power consuming device in the powertrain, such as the converter. In this case, the converter characteristics are altered accordingly.

The control means 215 comprises a memory, which in turn comprises a computer program with computer program segments, or a program code, for implementing the control method when the program is run. This computer program can be transmitted to the controller in various ways via a transmission signal, for example by downloading from another computer, via wire and/or wirelessly, or by installation in a memory circuit. In particular, the transmission signal can be transmitted via the Internet.

The invention also relates to a computer program product comprising computer program segments stored on a computer-readable means for implementing the measurement method when the program is run. The computer program product can consist of, for example, a diskette or a CD.

The invention is not to be considered to be limited to the embodiments described above, a number of additional variants and modifications being possible within the framework of the following patents claims.

The power source (prime mover) may not necessarily be an internal combustion engine, in the form of a diesel engine. Instead also other power sources, such as gasoline operated internal combustion engines, electric motors, alternative fuel prime movers and fuel cells may be used.

The powertrain may alternatively be configured for a hydrostatic power transmission. According to a further alternative, a hybrid powertrain may be used, comprising at least one electric motor and a power storage means, such as a battery or a supercapacitor connected thereto. Further, the inventive method may be used to control a power consuming device in such an alternative powertrain type.

The invention claimed is:

1. A method for controlling an input power to at least one power consuming device in a working machine, the working machine being provided with a power source for propelling the working machine, comprising
    detecting at least one first operational parameter indicative of an available output power of the power source and at least one second operational parameter,
    establishing a nominal power value based on the detected value of the first operational parameter by using a predetermined relation between the first operational parameter and the power, and establishing an offset from the nominal power value based on the second operational parameter,
    establishing a power value based on the detected values of the first and second operational parameters by adding the offset to the nominal power value, and
    controlling the power consuming device in response to the established power value.

2. A method according to claim 1, comprising using a standard curve representative of a relation between the first operational parameter and the power in order to establish the nominal power value.

3. A method according to claim 1, comprising detecting a plurality of second operational parameters and establishing the power value in response to the plurality of detected second operational parameters.

4. A method according to claim 1, comprising detecting a plurality of second operational parameters and establishing the offset in response to the plurality of detected second operational parameters.

5. A method according to claim 1, wherein the method is adapted for a vehicle comprising a power source configured to propel the vehicle and a hydraulic system, which comprises at least one power consuming device driven by the power source, and that the first operational parameter is detected separate from the hydraulic system.

6. A method according to claim 1, wherein the method is adapted for a vehicle and that the first operational parameter is indicative of an operational condition of a vehicle powertrain.

7. A method according to claim 1, wherein the method is adapted for a vehicle and that the first operational parameter is indicative of an available output torque of a power source configured to propel the vehicle.

8. A method according to claim 1, wherein the power consuming device is a hydraulic device.

9. A method according to claim 1, wherein the power consuming, device is a hydraulic actuator in a hydraulic system.

10. A method according to claim 1, wherein the power consuming device is a hydraulic pump with a variable displacement.

11. A method according to claim 10, wherein the hydraulic pump is arranged in a load sensing hydraulic system.

12. A method according to claim 10, comprising limiting a maximum displacement of the pump in response to the established power value.

13. A method according to claim 1, wherein the second operational parameter comprises an operator input signal.

14. A method according to claim 1, wherein the method is adapted for a vehicle and that the second operational parameter is indicative of an operational condition of a vehicle powertrain.

15. A method according to claim 1, wherein the second operational parameter comprises a turbocharger pressure.

16. A method according to claim 1, wherein the second operational parameter comprises a gear state.

17. A method according to claim 1, wherein the second operational parameter comprises a hydraulic pressure in a hydraulic system.

18. A method according to claim 1, wherein the second operational parameter comprises a position of an accelerator pedal.

19. A method according to claim 1, wherein the second operational parameter comprises an ambient pressure.

20. A method according to claim 1, wherein the second operational parameter comprises a vehicle speed.

21. A method according to claim 1, wherein the second operational parameter comprises a vehicle angle speed.

22. A system for controlling an input power to at least one power consuming device in a working machine, the working machine being provided with a power source for propelling the working machine, comprising means for detecting at least one first operational parameter indicative of an available output power of the power source, means for detecting at least at least one second operational parameter and for establishing a nominal power value based on the detected value of the first operational parameter by using a predetermined relation between the first operational parameter and the power, and establishing an offset from the nominal power value based on the second operational parameter, means for establishing a power value based on the detected values of the first and second operational parameters by adding the offset to the nominal power value, and means for controlling the power consuming device in response to the established, power value.

23. A work machine comprising the system of claim 22.

24. A work machine according to claim 23 comprising a forward frame, a rear frame and an articulation joint frame, to one connecting the forward frame to the rear which allows pivoting the frames relative another about a vertical axis for steering the machine.

25. A work machine according to claim 23, wherein the work machine constitutes a wheel loader.

26. A computer comprising a computer program for implementing the method as claimed in claim 1.

27. A computer program product stored, on a non-transitory computer-readable medium for implementing the method as claimed in claim 1 when the program is run on a computer.

\* \* \* \* \*